United States Patent [19]
Böhm

[11] Patent Number: 6,041,896
[45] Date of Patent: Mar. 28, 2000

[54] BRAKING SYSTEM WITH A LOGARITHMIC CHARACTERISTIC

[75] Inventor: Jörg Böhm, Sande, Germany

[73] Assignee: Grove U.S. L.L.C., Shady Grove, Pa.

[21] Appl. No.: 08/965,231

[22] Filed: Nov. 6, 1997

[30]      Foreign Application Priority Data

Nov. 20, 1996 [DE] Germany ............................ 196 48 064

[51] Int. Cl.[7] .................................................... F16D 55/36
[52] U.S. Cl. ............................................................. 188/71.5
[58] Field of Search ................................. 188/71.5, 71.6, 188/72.3, 73.31, 73.32, 73.33, 107, 106 F, 170, 73.45, 72.4

[56] References Cited

U.S. PATENT DOCUMENTS

| | | | |
|---|---|---|---|
| 3,927,737 | 12/1975 | Prillinger et al. ..................... | 188/106 F |
| 4,023,654 | 5/1977 | Winzeler ................................. | 188/170 |
| 4,491,202 | 1/1985 | Schmitt .................................. | 188/71.5 |
| 4,560,034 | 12/1985 | Windish et al. ........................ | 188/72.3 |
| 5,226,508 | 7/1993 | Ericson et al. .......................... | 187/254 |
| 5,228,543 | 7/1993 | Heidenreich ........................... | 188/72.4 |
| 5,603,395 | 2/1997 | Mabee .................................. | 192/70.13 |

*Primary Examiner*—Matthew C. Graham
*Assistant Examiner*—Melanie Talavera

[57]                ABSTRACT

The braking system includes a housing, and a friction brake disposed in the housing and operationally connected to a member-to-be-braked. A biasing piston, for engaging the friction brake, is disposed in the housing, and a control piston is also disposed in the housing. The control piston and the housing define a pressure chamber for receiving a pressure medium which biases the control piston away from the friction brake. A first resilient member is disposed between the control piston and the housing to bias the control piston towards the friction brake. A second resilient member is disposed between the control piston and the biasing piston for transferring force applied to the control piston by the first resilient member to the biasing piston so as to bias the biasing piston towards the friction brake. The fiction brake includes brake lamellae operationally and longitudinally displaceably connected to the housing. Pins are connected to the housing, and each pin has an annular shoulder disposed in a different longitudinal position from the annular shoulders for other pins. Each annular shoulder restricts longitudinal movement of at least one of the brake lamellae. The friction brake further includes brake disks operationally and longitudinally displaceably connected to a member-to-be-braked, and each brake disk is disposed between at least two of the brake lamellae.

15 Claims, 7 Drawing Sheets

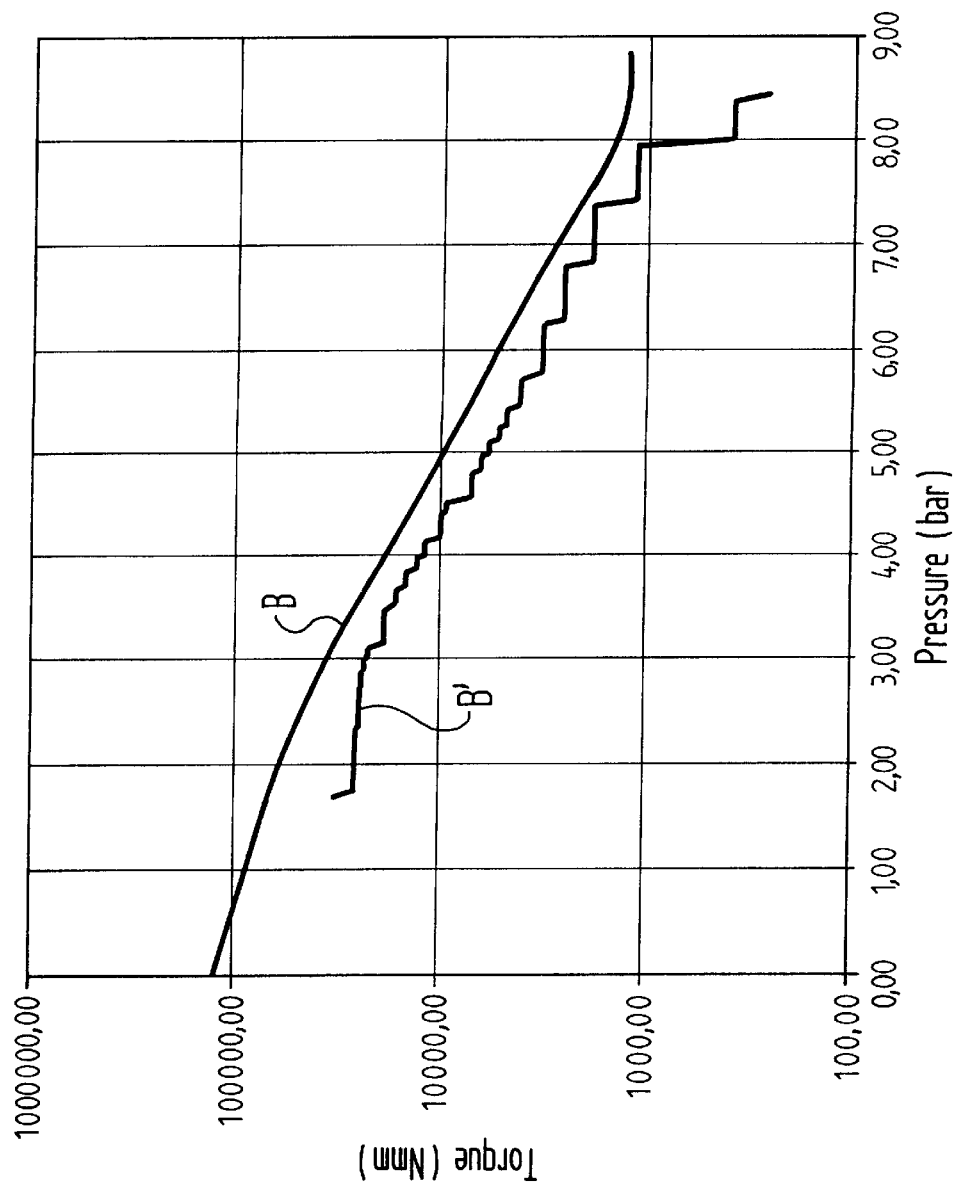

6,041,896

BRAKING SYSTEM WITH A LOGARITHMIC CHARACTERISTIC

BACKGROUND OF THE INVENTION

1. Field of the Invention

The present invention relates to a braking system; and more particularly, to a braking system having a logarithmic characteristic.

2. Description of Related Art

Known braking systems, used for multiple-disk brakes, include a shaft on which a brake piston is disposed. The brake piston is biased against a friction brake via a compression spring with a linear characteristic. The friction brake of such known systems includes brake disks fixed to the shaft, and brake lamellae located between the brake disks. The brake lamellae are secured in a longitudinally displaceable, but co-rotational fashion to a housing of the brake system. The compression spring biases the brake piston such that the brake piston pushes the brake lamellae and brake disks together; thus, bringing about the braking affect.

To release the brake, such conventional braking systems counteract the biasing effect of the compression spring by hydraulically actuating the brake piston using a liquid or gaseous medium. The more pressure exerted by the hydraulic system, the less the forward movement of the piston in the direction of the brake lamellae, and the less the braking effect. When the brake system is pressureless, the compression spring compresses the brake piston completely onto the friction brake bringing about the greatest braking effect (i.e., the greatest braking torque).

Typically, an annular chamber is formed between the piston and the brake system's housing. Specifically, the piston includes a small diameter portion and a large diameter portion. The small diameter portion extends towards the friction brake, while the large diameter portion extends away from the friction brake. The brake system housing is similarly constructed in that the inner surface thereof has a first portion extending away from the brake system with a diameter substantially equal to the large diameter of the brake piston, and a second portion extending towards the friction brake with a diameter substantially equal to the small diameter of the brake piston. The first portion of the housing has a predetermined length such that the brake piston can be compressed completely onto the friction brake.

The annular chamber is formed between the brake system housing and the brake piston where the brake piston changes from the small diameter portion to the large diameter portion and the brake system housing changes from the large diameter portion to the small diameter portion. When a pressure medium is supplied to this annular chamber, seals disposed on either side of the chamber prevent the pressure medium from leaking, and the pressure acts upon the radial surface of a shoulder created by the piston changing from a small diameter to a large diameter. The pressure acting upon this shoulder causes the piston to move in a longitudinal direction (i.e., an axial direction of the shaft) away from the friction brake. When the force applied by the pressure medium is greater than the force of the compression spring, the brake is completely disengaged.

Such conventional brake systems have a number of disadvantages. Because the compression spring has a linear characteristic, a linear relationship exists between the pressure of the applied pressure medium and the braking torque. Consequently, a relatively large change in the braking effect occurs due to a small change in the pressure of the pressure medium when the pressure of the pressure medium is high. Unfortunately, when the braking effect is low, it is more desirable to be able to gradually increase or decrease the braking effect. Conventional brake systems, however, cannot achieve gradual increases or decreases in the braking effect when the braking effect is low (i.e., when the pressure of the pressure medium is high).

This problem is aggravated by the fact that the seals for maintaining the pressure medium within the annular chamber cause a hysteresis in the movement of the brake piston (i.e., the seals hinder the movement of the brake piston due to friction between the seals and the walls of the piston). This adversely affects the capacity of the brake system to gradually change the braking effect in the low braking torque range. If the friction force of the seal is greater than the force used to apply the braking torques, then small braking torques can no longer be regulated.

Such conventional brake systems combine the cooling and pressure hydraulics into one system. The cooling of the brake lamellae with hydraulic oil, however, does not lead to the intended ideal stick-slip-free braking behavior. This ideal braking behavior does not occur even if, for instance, ATF oils are used in the entire hydraulic system. Even so, these oils are too expensive for a combined cooling and hydraulic system due to the large volume of such a system.

A further problem of known brake systems resides in the difficulties of dismounting the brake linings, and in that the brake lamellae are heated by friction during idling where no braking effect occurs. In other words, even when the brake piston is fully disengaged, the brake lamellae may rub against the brake disks. To solve this problem, the use of spring washers or sine lamellae is necessary. Moreover, as a result of fluid friction, a high torque build up occurs because of the idling friction and torques which vary greatly with the number of revolutions of the shaft.

SUMMARY OF THE INVENTION

It is an object of the present invention to provide a braking system which overcomes the problems and disadvantages discussed above.

Another object of the present invention is to provide a brake system having a logarithmic characteristic.

A further object of the present invention is to provide a brake system which can gradually increase or decrease the braking effect.

These and other objects of the present invention are achieved by a braking system, comprising: a housing; a friction brake disposed in said housing and operationally connected to a member-to-be-braked; a biasing piston, for engaging said friction brake, disposed in said housing; a control piston disposed in said housing, said control piston and said housing defining a pressure chamber for receiving a pressure medium which biases said control piston away from said friction brake; a first resilient member disposed between said control piston and said housing to bias said control piston towards said friction brake; and a second resilient member disposed between said control piston and said biasing piston for transferring force applied to said control piston by said first resilient member to said biasing piston to bias said biasing piston towards said friction brake.

These and other objects are further achieved by a friction brake, comprising: brake lamellae operationally and longitudinally displaceably connected to a housing; pins connected to said housing, each pin having an annular shoulder disposed in a different longitudinal position from said annular shoulders for other ones of said pins, each annular shoulder restricting longitudinal movement of at least one of said brake lamellae; and brake disks operationally and longitudinally displaceably connected to a member-to-be-braked, each brake disk being disposed between at least two of said brake lamellae.

Further scope of applicability of the present invention will become apparent from the detailed description given hereinafter. However, it should be understood that the detailed description and specific examples while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration, and thus are not limitative of the present invention, and wherein:

FIG. 7 shows the diagram of FIG. 6 with a logarithmically subdivided braking torque axis.

DETAILED DESCRIPTION OF THE PREFERRED EMBODIMENTS

Figure 1:
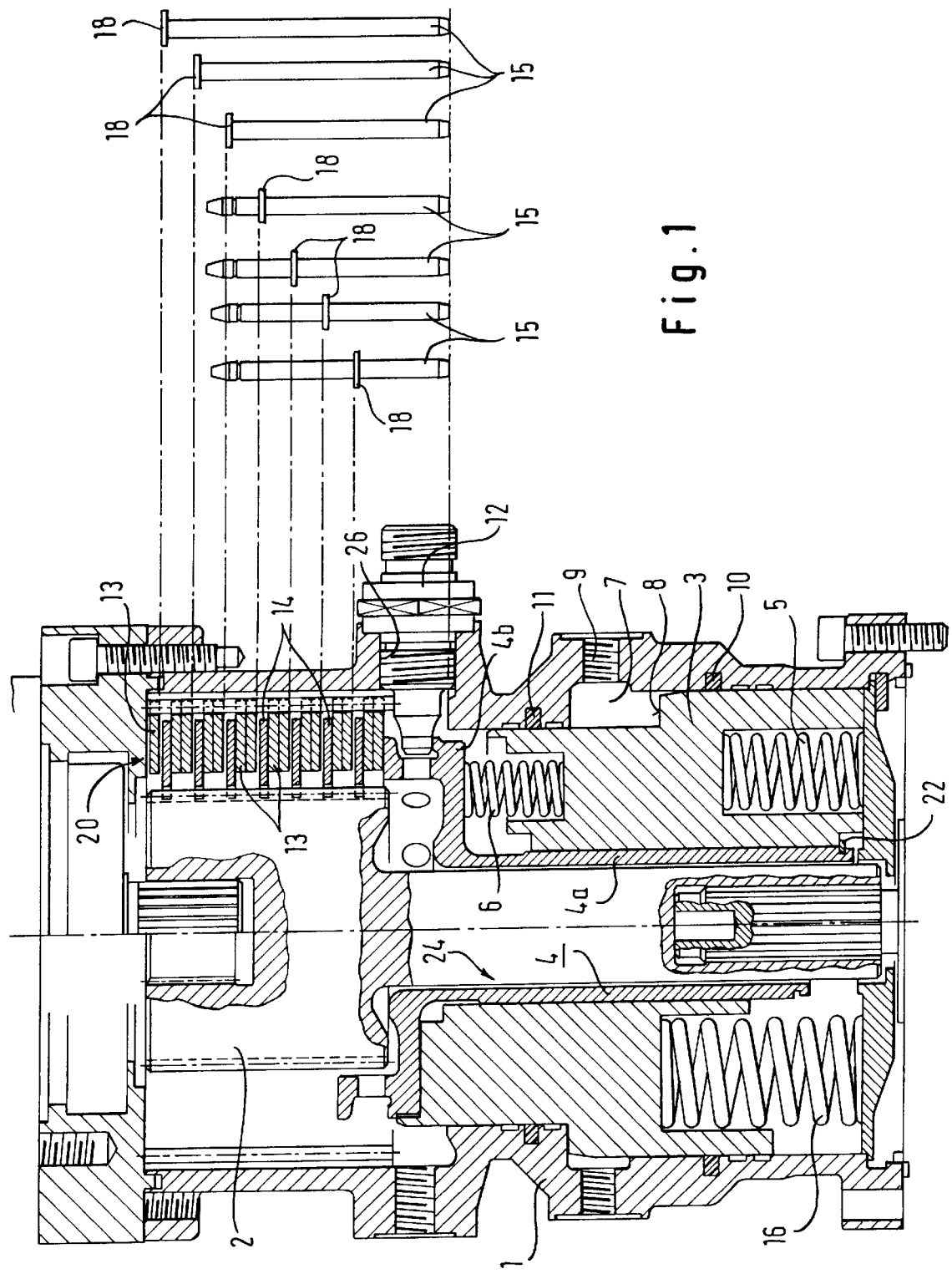
FIG. 1 shows a longitudinal section through a braking system according to the invention.

FIG. 1 illustrates a longitudinal cross-section of the multi-disk braking system according to the present invention. As shown in FIG. 1, the entire multi-disk brake system is accommodated within a housing 1. A shaft 2 extends through the housing 1, and may, for instance, be connected with a motor or gear arrangement. A multiple-disk friction brake 20 is disposed at the upper end of the shaft 2, and, as shown, includes brake disks 14 and brake lamellae 13. The brake disks 14 are positioned non-rotatably with respect to the shaft 2 on teeth in the upper end of the shaft 2, and can be displaced longitudinally thereon.

As is apparent from FIG. 1, only the right hand side of the friction brake 20 is shown. Furthermore, FIG. 1 illustrates the disengaged condition of the friction brake 20 on the right hand side of the shaft 2, and illustrates the engaged condition of the friction brake 20 on the left hand side of the shaft 2.

The brake lamellae 13 are inserted into an inner toothing of the housing 1 in a longitudinally displaceable fashion, but in a non-rotatable fashion with respect to the housing 1. Furthermore, the brake disks 14 are disposed such that each brake disk 14 lies between two or more brake lamellae 13. The friction brake 20 further includes spacer pins 15 mounted on the housing 1.

For purposes of illustration, the spacer pins 15 have been illustrated on the right hand side of FIG. 1. As shown, the spacer pins 15 have shoulders 18. The shoulders 18 serve to restrict the longitudinal movement of the brake lamellae 13 such that the brake lamellae 13 are kept at specific vertical positions when the friction brake 20 is disengaged. Thus, a gap is defined between the brake lamellae 13 and the brake disks 14 during idling (i.e., when the brake is disengaged). This gap prevents direct friction between the brake lamellae 13 and the brake disks 14 during idling such that only fluid friction caused by cooling/lubrication oil, which is located between the brake disks 14 and brake lamellae 13, occurs. Because of the spacer pins 15, the self-heating problem of the conventional brake system is overcome, and a low idling torque is obtainable. As an alternative to the pins 15, the housing 1 can include milled recesses of a specific depth for each brake lamella 13.

Because, as described below, the hydraulic system is separate from the cooling/lubrication system, the cooling/lubrication oil circulation has a relatively small volume. Thus, high quality ATF oil can be used without a detrimental increase in operational expense.

As shown in FIG. 1, the brake system according to the present invention further includes a piston unit 24 disposed in a lower portion of the housing 1. As mentioned previously, the piston unit 24 is shown in the engaged position on the left hand side of the shaft 2, and in the disengaged position on the right hand side of the shaft 2.

The piston unit 24 includes a biasing piston 4 and a control piston 3. The biasing piston 4 includes a tubular section 4a concentric with the shaft 2 and an annular extension section 4b. The annular extension section 4b has a substantially plate-shape, and contacts the friction brake 20. The control piston 3 is concentric with the tubular section 4a of the biasing piston 4.

A plurality of first compression springs 6 are disposed between an upper surface of the control piston 3 and the annular extension section 4b of the biasing piston 4. A second plurality of compression springs 5 are disposed in associated recesses in the lower end of the control piston 3 such that the second plurality of compression springs 5 are disposed between the control piston 3 and a lower part of the housing 1. Similarly, a third compression spring 16 is partially disposed in a recess in the lower end of the control piston 3 such that the third compression spring 16 is disposed between the control piston 3 and the lower part of the housing 1. The second and third compression springs 5 and 6 exert a force on the control piston 3 in the axial direction of the shaft 2 towards the friction brake 20. The first compression springs 6 transfer a portion of this force to the biasing piston 4.

The control piston 3 is guided between the outer wall of the tubular section 4a of the biasing piston 4 and the inner wall of the housing 1. The control piston 3 has a small diameter portion and large diameter portion such that an annular radial surface 8 is created at the junction between the small diameter and large diameter portions. As shown in FIG. 1, the radial annular surface 8 is formed approximately at the center of the control piston 3. Complimentary therewith, the inner wall of the housing 1 has a small diameter portion and large diameter portion. The large diameter portion of the housing 1, however, has a greater longitudinal length that of the small diameter portion of the control piston 3 such that an annular chamber 7 is created between the housing 1 and the control piston 3.

A bore 9 in the housing 1 allows fluid communication with the annular chamber 7. It is through the bore 9 that a pressure medium such as hydraulic oil is supplied to the annular chamber 7. By supplying hydraulic oil via the bore 9 to the annular chamber 7, the control piston 3 can be moved in the axial direction of the shaft 2 away from the friction brake 20. A first and second set of seals 10 and 11, on either side of the annular chamber 7, prevent the hydraulic fluid in the annular chamber 7 from leaking therefrom.

The housing 1 further includes a second bore 26 into which a locking bolt 12 is removably inserted. The bore 26 includes threads which allow the locking bolt 12 to be screwed in or out of the bore 26. The locking bolt 12, when screwed in, engages the rim of the annular extension section 4b of the biasing piston 4 when the friction brake is disengaged (i.e., during idling). Consequently, even if the hydraulic pressure in the annular chamber 7 is completely removed, the friction brake remains disengaged by the action of the locking bolt 12. By engaging the locking bolt 12, the housing 1 can be opened so that maintenance, such as replacement of the brake lamellae 13, can be performed.

As further shown in FIG. 1, a locking ring 22 is fixed to the lower portion of the tubular section 4a. The locking ring 22 is positioned such that it will come into contact with a lower end of the control piston 3 as the control piston 3 moves axially away from the friction brake 20.

The operation of the braking system according to the present invention will now be described in detail. When no hydraulic pressure is supplied to the annular chamber 7, the second and third compression springs 5 and 16 bias the control piston 3 towards the friction brake 20, the force exerted by the second and third compression springs 5 and 16 is transferred from the control piston 3 to the biasing piston 4 by the first compression springs 6.

Accordingly, the biasing piston 4 moves in the axial direction towards the friction brake 20 such that the annular extension section 4b completely engages the friction brake 20 to achieve maximum braking effect or braking torque. To release the braking torque or effect, hydraulic pressure is supplied to the annular chamber 7 by supplying a pressure medium such as hydraulic oil to the annular chamber 7 via the bore 9. As the pressure in the annular chamber 7 increases, the force exerted by the second and third compression springs 5 and 16 is overcome, causing the control piston 3 to move axially away from the friction brake 20.

As a result, the force transmitted from the second and third compression springs 5 and 16 to the biasing piston 4 by the first compression springs 6 decreases, and the braking effect or braking torque decreases. As the pressure in the annular chamber 7 increases, the control piston 3 moves further from the friction brake 20 in the axial direction such that the end of the control piston 3 contacts the locking ring 22. Once this occurs, any further movement of the control piston 3 axially away from the friction brake 20 causes the biasing piston 4 to likewise move axially away from the friction brake 20. When the pressure in the annular chamber 7 fully overcomes the force of the second and third compression springs 5 and 16. The friction brake 20 will be disengaged (i.e., idling).

While idling, the locking bolt 12 can be inserted or if already inserted, can be removed and replaced with a seal.

Also, at start-up in the idling state, ATF oil is supplied to the friction brake 20 prior to operation. As mentioned above, in this disengaged position, the annular chamber 7 is under its highest pressurization. If the rotating shaft 2 is to be braked, the pressure in the annular chamber 7 is reduced via suitable shut off valves (not shown).

Except for the final stages of disengaging the friction brake 20, the control piston 3 is decoupled (i.e., not directly coupled) to the biasing piston 4. Instead, force acting on the control piston 3 is transferred to the biasing piston 4 by the first compression springs 6. Thus, as shown in FIG. 1, only the control piston 3 experiences a frictional hinderance to its movement because of seals 10 and 11 around the annular chamber 7. Because the biasing piston 4 is decoupled from the control piston 3, the frictional hindrance caused by the seals 10 and 11 do not substantially affect the biasing piston 4. Consequently, the capacity of the braking system according to the present invention to gradually increase or decrease braking effect or braking torque is not adversely effected by the use of seals 10 and 11. Besides reducing the transmission of the friction effects caused by the seals 10 and 11, the decoupling also improves braking regulation in the low braking effect range.

The first, second, and third compression springs 6, 5, and 16 are selected to have spring characteristics such that the braking effect can be finely regulated, particularly, in the small braking torque range. Further, all the springs are distributed around the periphery of the control and biasing pistons 3 and 4 in such a fashion, as regards to their spring effects and arrangements, that their total force acts in the axial direction of the shaft 2 so as not to render the guiding of the different elements difficult or to damage those elements during operation.

A spring with a linear characteristic, which causes a defined braking torque with a braking pressure of substantially 0 bar, may be selected as the third compression spring 16. The first and second compression springs 6 and 5, however, are selected to optimize the braking torque/braking pressure characteristic; namely, such that the braking torque/braking pressure characteristic is substantially logarithmic. The braking torque/braking pressure characteristics of the present invention will now be described along with the spring characteristics of first and second compression springs 6 and 5.

Figure 2:
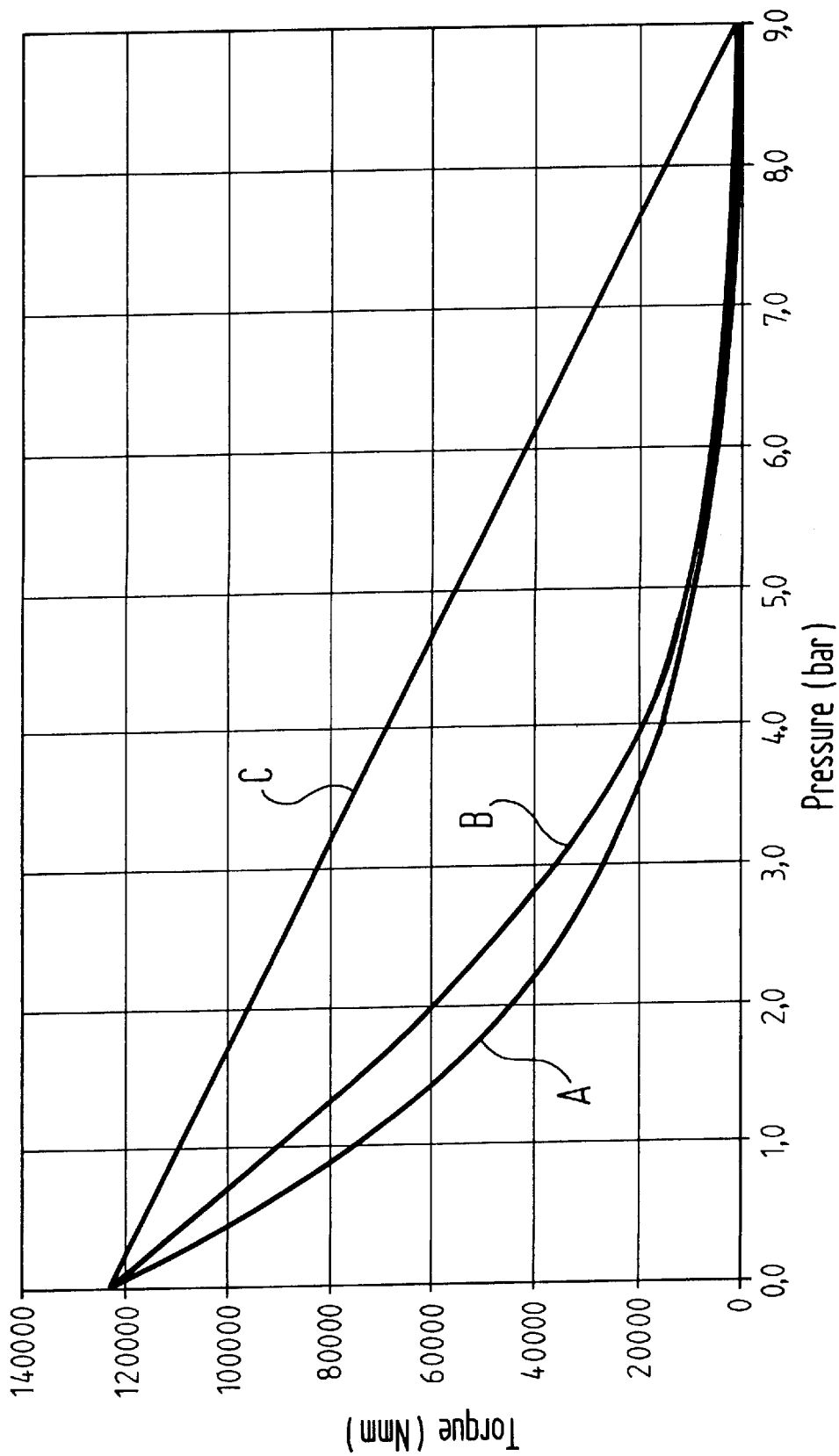
FIG. 2 shows a linear diagram of the braking torque/braking pressure with characteristics for the ideal braking system, for the braking system according to the present invention and for the conventional braking system.

FIG. 2 shows a linear diagram of the braking torque/braking pressure with the theoretical ideal profile shown by line A, the profile for the braking system according to the present invention shown by line B, and the profile for the conventional braking system shown by line C.

Of particular interest is the range of small braking torques (i.e., the range up to about 20,000 Nmm). The braking system must be well regulatable in this range. From the profile C for the conventional braking system, it is apparent that the braking effect increase relatively rapidly with a reduction in pressure. For instance, when pressure changes from 9 bar to 4 bar, braking torque increases by 70,000 Nmm. As a result, a jerking, braking action occurs.

By contrast, in the profile B for the braking system according to the present invention, which approximates the ideal profile A, the braking affect increases slowly when a decrease in pressure takes place in the small braking torque range. Thus, a low initial increase of the braking effect takes place with a large pressure release such that in the low braking torque range, the braking torque or braking effect can be gradually increased or decreased.

Figure 3:
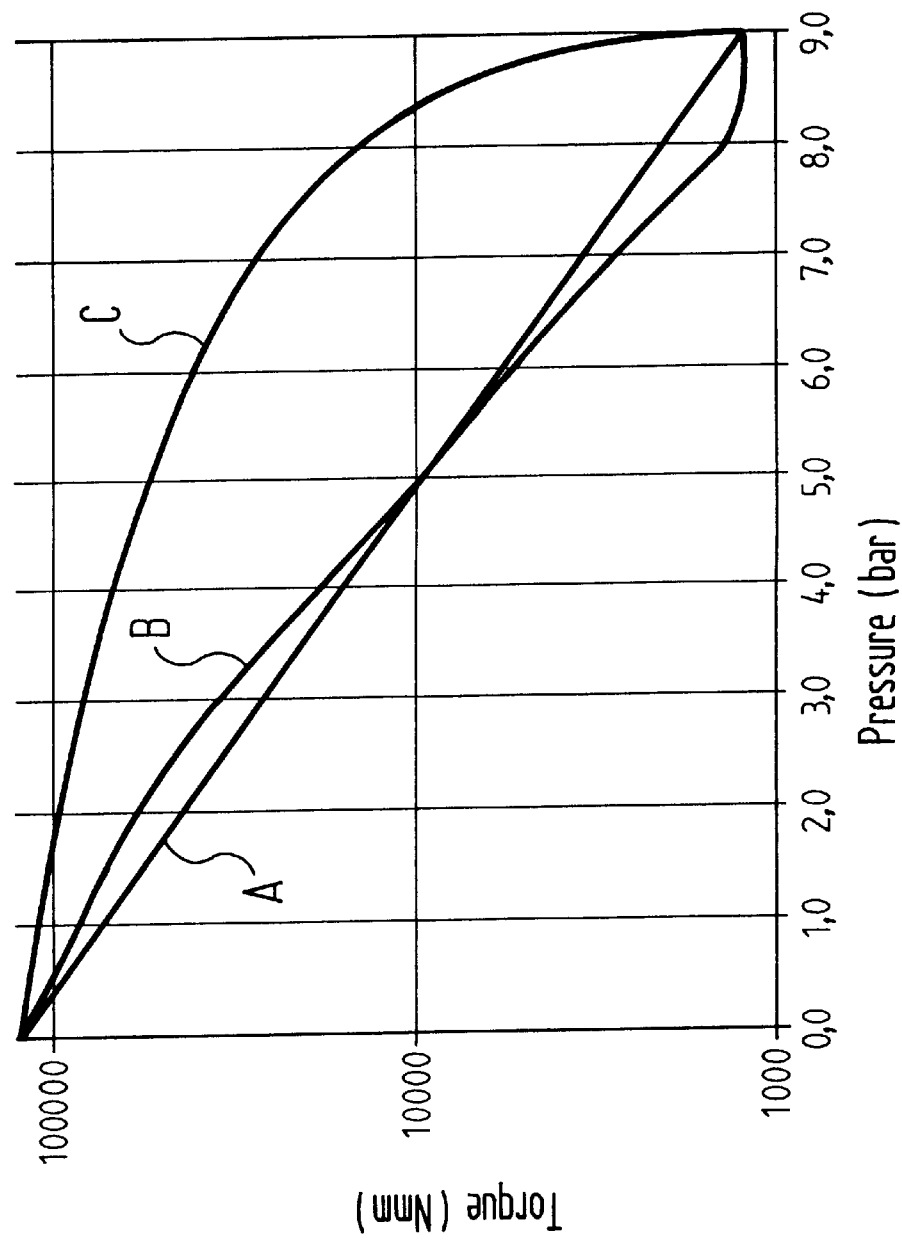
FIG. 3 is a logarithmic version of FIG. 2.

FIG. 3 is a logarithmic representation of the braking torque/braking pressure profiles shown in FIG. 2. The great deviation between ideal profile A and the profile C for the conventional braking system as well as the resulting jerking braking effect are even more apparent from FIG. 3. It is also clear that the profile B for the braking system according to the present invention closely approximates the ideal profile A.

Figure 4:
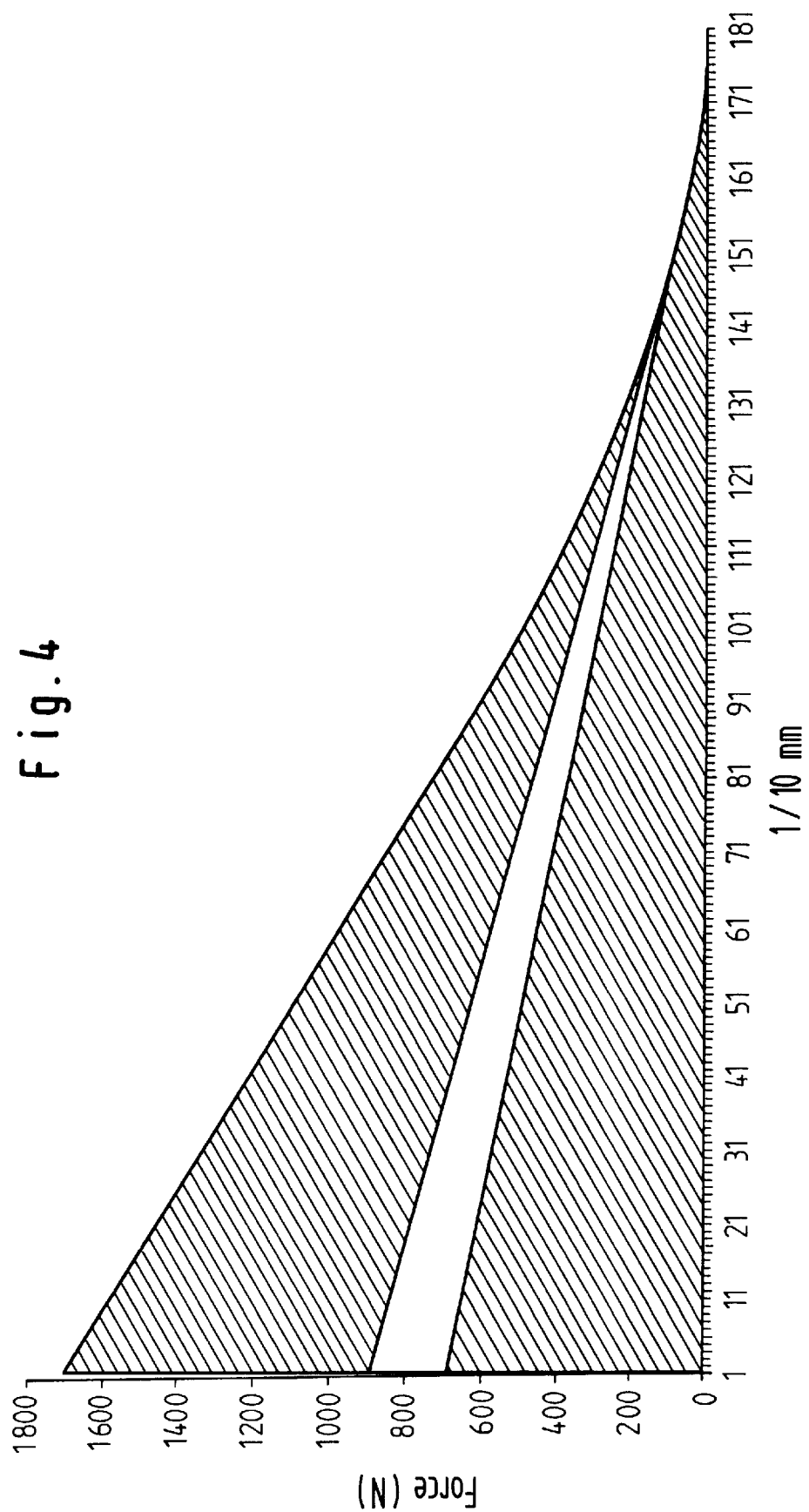
FIG. 4 shows a spring characteristic of the compression springs for the control piston.
Figure 5:
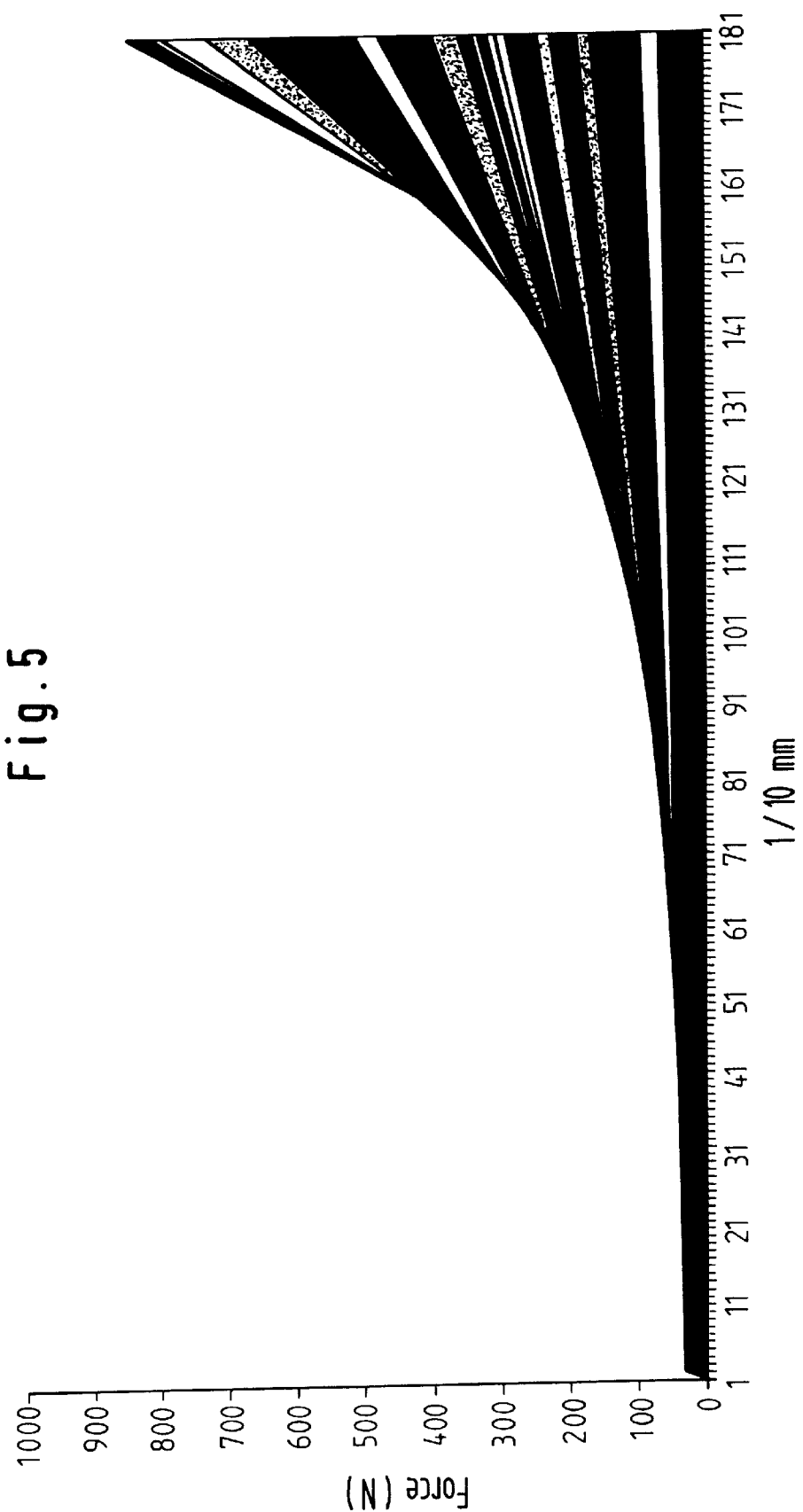
FIG. 5 shows a spring characteristic of the compressions springs between the brake pistons.

Achieving the braking profile discussed above with respect to the braking system according to the present invention is the result, in part, of the spring characteristics selected for the first and second compression springs 5 and 6. FIG. 4 illustrates the total spring characteristics for all of the second compression springs 5, while FIG. 5 illustrates the total spring characteristics for all of the first compression springs 6. In FIG. 4, the left side of the graph represents when the control piston 3 fully compresses the second compression springs 5. This corresponds to the left side of the graph in FIG. 5 wherein the first springs 6 are relieved of compression. The right side of the graph in FIG. 4 represents when the second compression springs 5 are relieved of compression. This corresponds to the right side of the graph in FIG. 5 wherein the control piston 3 fully compresses the first springs 6. Accordingly, the displacement along the horizontal axis in FIGS. 4 and 5 is the same displacement of the control piston 3 from a position fully compressing the second compression springs 5 to fully compressing first compression springs 6.

By appropriately selecting the spring characteristics of the first and second compression springs 6 and 5, good gradation in the range of small braking effect such as shown in FIGS. 3 and 4 is achieved. In other words, the total spring effect of the first and second compression springs 6 and 5 results in the logarithmic braking profile shown in FIGS. 2 and 3.

Figure 6:
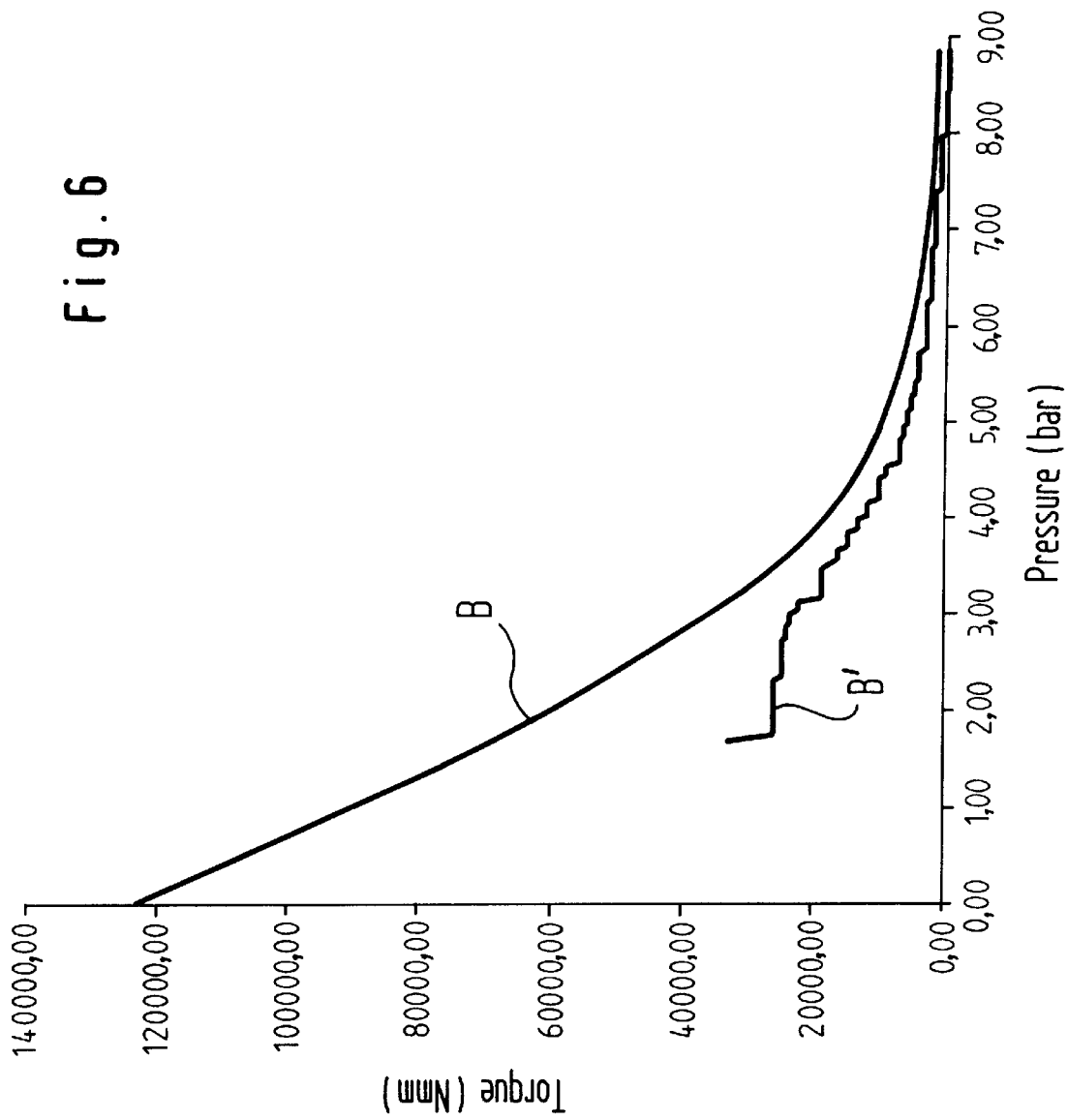
FIG. 6 shows a linear diagram of the braking torque/braking pressure profile for the braking system according to the present invention and the derivative thereof.

FIG. 6 illustrates the braking torque profile B for the braking system according to the present invention as well as the first derivative B' thereof. The first derivative profile B' makes an evaluation of the gradation capacity possible. As shown, the first derivative B' also has a logarithmic characteristic wherein in the range of high pressure, i.e., small braking torques. The first derivative profile B' shows small changes in braking torque with respect to larger changes in pressure.

FIG. 7 shows the diagram of FIG. 6 with a logarithmically subdivided braking torque vertical axis. As shown in FIG. 7, both the braking torque profile B and the first derivative profile B' extend in a substantially linear fashion. Ignoring the steps in the first derivative profile B' caused by the engagement of the individual springs, the first derivative profile B' indicates good gradation in the ranges of small and higher braking pressures.

The braking system according to the present invention is, among other applications, particularly applicable to the braking of greatly differing mass moments of inertia such as occur in crane systems with variable jib lengths. For instance, the braking system according to the present invention makes the fine positioning of a load possible when used as the braking system for the turntable of a mobile crane which supports a boom thereon.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A braking system, comprising:
   a housing;
   a friction brake disposed in said housing and operationally connected to a member-to-be-braked;
   a biasing piston, for engaging said friction brake, disposed in said housing;
   a control piston disposed in said housing, said control piston and said housing defining a pressure chamber for receiving a pressure medium which biases said control piston away from said friction brake;
   a first resilient member disposed between said control piston and said housing to bias said control piston towards said friction brake; and
   a second resilient member disposed between said control piston and said biasing piston for transferring force applied to said control piston by said first resilient member to said biasing piston to bias said biasing piston towards said friction brake.

2. The braking system of claim 1, wherein said friction brake comprises:
   brake lamellae operationally and longitudinally displaceably connected to said housing; and
   brake disks operationally and longitudinally displaceably connected to a member-to-be-braked.

3. The braking system of claim 1, wherein said friction brake comprises:
   brake lamellae operationally and longitudinally displaceably connected to said housing;
   pins connected to said housing, each pin having an annular shoulder disposed in a different longitudinal position from said annular shoulders for other ones of said pins, each annular shoulder restricting longitudinal movement of at least one of said brake lamellae; and
   brake disks operationally and longitudinally displaceably connected to a member-to-be-braked, each brake disk being disposed between at least two of said brake lamellae.

4. The braking system of claim 1, wherein
   said biasing piston includes a tubular section and an annular extension section disposed at one end of said tubular section; and
   said control piston surrounds said tubular section and is guided between said biasing piston and said housing.

5. The braking system of claim 1, further comprising:
   seals sealing said pressure chamber; and wherein
   said housing includes a bore in fluid communication with said annular pressure chamber.

6. The braking system of claim 1, wherein said second resilient member is a compression spring.

7. The braking system of claim 1, wherein said first and second resilient members have spring characteristics such that a braking torque profile of said braking system is substantially logarithmic with respect to a pressure of said pressure medium supplied to said pressure chamber.

8. The braking system of claim 7, wherein said first and second resilient members are compression springs.

9. The braking system of claim 1, wherein said first and second resilient members are compression springs.

10. The braking system of claim 1, wherein said first and second resilient members each include a plurality of compression springs positioned such that said friction brake is symmetrically engaged and disengaged.

11. The braking system of claim 1, further comprising:
    a third resilient member disposed between said control piston and said housing to bias said control piston towards said friction brake, said third resilient member having a linear spring characteristic.

12. The braking system of claim 11, wherein said third resilient member is a compression spring.

13. The braking system of claim 1, further comprising:
    a locking bolt removably attachable to said housing via a bore therein such that when said friction brake is disengaged, said locking brake locks a position of said biasing piston.

14. The braking system of claim 1, wherein said pressure chamber is an annular chamber.

15. A friction brake, comprising:

brake lamellae operationally and longitudinally displaceably connected to a housing;

pins connected to said housing, each pin having an annular shoulder disposed in a different longitudinal position from said annular shoulders for other ones of said pins, each annular shoulder restricting longitudinal movement of at least one of said brake lamellae; and brake disks operationally and longitudinally displaceably connected to a member-to-be-braked, each brake disk being disposed between at least two of said brake lamellae.

* * * * *